P. ROTONDO.
KETTLE.
APPLICATION FILED JAN. 30, 1909.

964,815.

Patented July 19, 1910.

WITNESSES:

INVENTOR
Peter Rotondo,
ATTORNEY

UNITED STATES PATENT OFFICE.

PETER ROTONDO, OF NEW YORK, N. Y.

KETTLE.

964,815.  Specification of Letters Patent.  Patented July 19, 1910.

Application filed January 30, 1909. Serial No. 475,089.

*To all whom it may concern:*

Be it known that I, PETER ROTONDO, a citizen of the United States, residing at New York, in the county of New York and State of New York, have invented new and useful Improvements in Kettles, of which the following is a specification.

My invention relates particularly to a kettle to be used for cooking and draining. Such vessels are sometimes called pots, pans or kettles depending upon the size, shape and particular purpose for which they are used. For convenience I will refer to the structure simply as a kettle.

The object is to provide a convenient means for draining the water or other liquid from the kettle which means will always be available and which will permit of the use of the ordinary cover commonly employed with cooking kettles and which will permit the water or other liquid to be drained from the kettle quickly without loss of the solid matter contained therein and which will hold the cover in place when the kettle is hung up.

The accompanying single sheet of drawings illustrates the principles of the invention as applied to one form of kettle.

Figure 1:
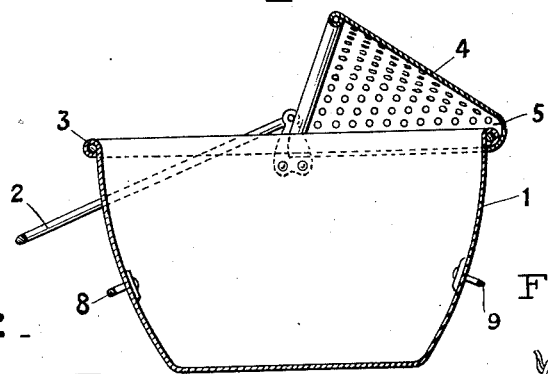
Figure 2:
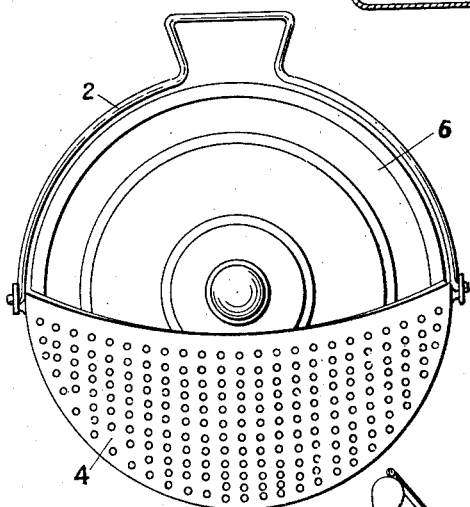
Figure 3:
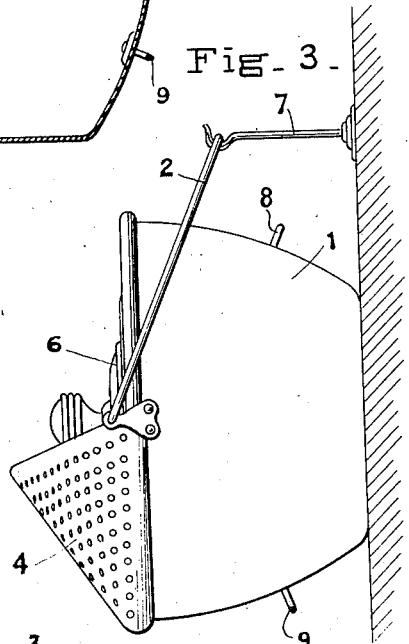
Figure 4:
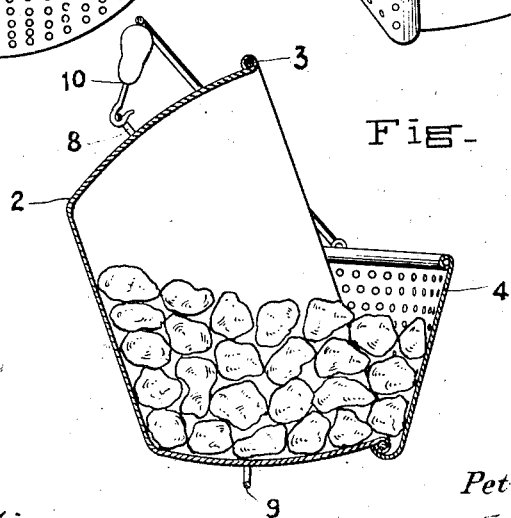

Figure 1, is a vertical section of a kettle embodying my invention. Fig. 2, is a plan view with a cover in place. Fig. 3, is a side view, the kettle being shown hung up on a wall hook with the cover in place. Fig. 4, is a section of the kettle in position for draining the water or other liquid from the kettle and retaining the contents—for instance—potatoes.

The body 1 is of suitable shape, size and material and preferably has some form of a handle such as the bail 2 for convenience in handling it.

Around the rim 3 of the body at one side I secure the lower edge of a strainer 4 which is arched upwardly and inwardly from the rim of the kettle. This leaves a sort of pocket 5 around the rim inside of the strainer in which the usual cover 6 of the kettle may conveniently be inserted. It also serves to hold the cover in place when handling the kettle and when it is hung, for instance, on a wall hook 7, in the position of Fig. 3.

For convenience in handling the kettle a pair of staples or eyes such as 8 and 9 may be secured to the body of the kettle and a hook 10 may be used to engage one or the other of the eyes for instance, as in Fig. 4 to assist in tilting the kettle.

The position of Fig. 4 is the position in which the water or other liquid is drained from the kettle. In this position it will be noted that the strainer extends upward and backward from the rim to such an extent as to provide a considerable space for the contents and effectively prevent any of the solid contents from falling from the kettle while draining.

The strainer being arch-shaped and secured to the body of the kettle stiffens the body so that it may be made of thinner and lighter and less expensive metal. It also serves as a sort of auxiliary handle by which the kettle may be picked up quickly in case of an emergency.

What I claim is:—

A kettle comprising a body portion having a rim, a suitable handle, an arched strainer secured around the rim at one side of the body and extending upward above the rim and inward over the body and furnishing a substantial volume for the contents back of the strainer when the kettle is tilted and leaving room around the rim at the top of the kettle beneath the strainer to accommodate and hold a cover for the kettle.

In testimony whereof I affix my signature in presence of two witnesses.

PETER ROTONDO.

Witnesses:
 FRANK J. MANN,
 SEMPLICIO SAIRAND.